United States Patent
Anati et al.

(10) Patent No.: US 7,761,442 B1
(45) Date of Patent: Jul. 20, 2010

(54) DATABASE SEARCH SYSTEM FOR HIGH FREQUENCY ELECTRONIC COMPONENTS

(75) Inventors: Eitan Anati, Timrat (IL); Harvey L. Kaylie, Brooklyn, NY (US)

(73) Assignee: Scientific Components Corporation, Brooklyn, NY (US)

( * ) Notice: Subject to any disclaimer, the term of this patent is extended or adjusted under 35 U.S.C. 154(b) by 532 days.

(21) Appl. No.: 11/731,244

(22) Filed: Mar. 29, 2007

(51) Int. Cl.
*G06F 17/30* (2006.01)

(52) U.S. Cl. ...................... 707/708; 707/705

(58) Field of Classification Search .............. 707/1–3, 707/6; 705/27; 700/97
See application file for complete search history.

(56) References Cited

U.S. PATENT DOCUMENTS

| | | | | |
|---|---|---|---|---|
| 5,142,662 | A | * | 8/1992 | Gump et al. ............ 715/255 |
| 5,165,015 | A | * | 11/1992 | Coggins ................ 715/700 |
| 5,257,355 | A | | 10/1993 | Akamatsu |
| 5,272,641 | A | * | 12/1993 | Ford et al. ............. 700/97 |
| 5,293,479 | A | * | 3/1994 | Quintero et al. ......... 715/841 |
| 5,694,546 | A | * | 12/1997 | Reisman ................ 705/26 |
| 5,721,832 | A | * | 2/1998 | Westrope et al. ......... 705/27 |
| 5,777,876 | A | * | 7/1998 | Beauchesne ............. 700/95 |
| 5,897,639 | A | * | 4/1999 | Greef et al. ............ 1/1 |
| 5,907,489 | A | * | 5/1999 | Elliott ................. 700/97 |
| 5,942,956 | A | | 8/1999 | Haq |
| 6,002,650 | A | * | 12/1999 | Kuribayashi et al. ...... 700/117 |
| 6,334,115 | B1 | | 12/2001 | Kuribayashi |
| 6,401,006 | B1 | | 6/2002 | Mizuno |
| 6,484,169 | B1 | | 11/2002 | Wilsford |
| 6,615,166 | B1 | | 9/2003 | Guheen |
| 6,704,024 | B2 | | 3/2004 | Robotham |
| 6,769,009 | B1 | | 7/2004 | Reisman |
| 6,983,236 | B1 | | 1/2006 | Karlovac |
| 7,010,472 | B1 | | 3/2006 | Vasey-Glandon |
| 7,016,811 | B2 | | 3/2006 | Peck |
| 7,039,897 | B2 | | 5/2006 | Anderson |
| 7,061,500 | B1 | | 6/2006 | Baldwin |
| 7,065,625 | B2 | | 6/2006 | Alderson |
| 7,069,095 | B2 | | 6/2006 | Nelson |
| 7,127,459 | B2 | * | 10/2006 | Kuribayashi et al. ........ 707/6 |
| 2002/0015042 | A1 | | 2/2002 | Robotham |
| 2004/0239681 | A1 | | 12/2004 | Robotham |
| 2005/0108310 | A1 | | 5/2005 | Conrad |
| 2005/0246403 | A1 | | 11/2005 | Lee |
| 2006/0036422 | A1 | | 2/2006 | Gryba |

OTHER PUBLICATIONS

Mini-Circuits, Yoni, The Design Engineers Search Engine User's Guide, 2001.

* cited by examiner

*Primary Examiner*—Don Wong
*Assistant Examiner*—Sheree N Brown
(74) *Attorney, Agent, or Firm*—Siegmar Silber

(57) ABSTRACT

A high frequency electronic component database search system is described. The system is designed to allow rapid online searches for a variety of types of components, each type of component present in considerable variety within the database, and each individual component having a volume of parametric and physical data. Search functions include entering a mixture of required and optional parameter values and parameter value ranges, and prioritizing one or more search parameters to improve data matching. Output options from the search system include a comprehensive range of presentations of tabular, graphed and mechanical data.

25 Claims, 6 Drawing Sheets

DATABASE SEARCH SYSTEM FOR HIGH FREQUENCY ELECTRONIC COMPONENTS

CROSS REFERENCE TO RELATED APPLICATIONS

N/A

STATEMENT REGARDING FEDERALLY SPONSORED RESEARCH OR DEVELOPMENT

N/A

TECHNICAL FIELD

The present invention relates generally to database search systems for high frequency electronic components. More specifically, the invention relates to rapid and efficient online parameter-based database search systems for a large variety of electronic components, each with a volume of performance data and physical data, wherein the search results also provide the user with the option of obtaining component data including tabular and graphed depictions of component performance over the range of search parameters input.

BACKGROUND INFORMATION

Engineers designing circuits in the radio frequency (RF) and microwave range have to search through published and online data sheets, online databases and assorted formats of catalogs in order to find appropriate components to match to specific applications. Engineers have to search through an enormous amount of data to find the best component for a particular requirement, and even the experienced high-frequency design engineer is challenged to understand how some components can fit into a circuit or system better than others.

As used herein, radio frequency is taken to mean the high frequency portion of the electromagnetic spectrum, from at least 3 MHz. Microwave is taken to mean frequencies from at least 300 MHz.

In some design circumstances, a high frequency design engineer will choose to select a component with broader-than-needed general performance characteristics in order to gain improved performance in one or more parameters over a narrower frequency range. For example, rather than simply selecting a double-balanced mixer with RF and intermediate frequency (IF) ranges to translate a desired signal band, the engineer may use broader-band mixers over narrower portions of their range to meet a required linearity specification, or conversion-loss level, or optimum local-oscillator (LO) drive level. This illustrates the complexity of design choices made in selecting high frequency electronic components.

Component searches are increasingly performed over highly distributed computer networks due to the ready availability of the World Wide Web and high-speed Internet access, coupled with ever-improving software and server technology for powering content-rich websites. Online (web-based) catalogs represent one class of computer databases, with online catalogs containing parametric data being a significant subset of those. A further significant subset of this type of catalog allows the user to enter choices for a variety of component parameters to search for at once, to aid in efficient searching for a particular component to be appropriate for use under specific performance conditions. Some catalog database search systems of this type also allow the user to perform a limited range of performance simulations as well.

The majority of online catalogs are based on a server-side system, where the user's machine is not performing any calculations or storing any data. Generally such a system is providing the catalog database function to a large number of users at once and the database is very large, so it is imperative that the system be designed to provide a sufficient quality of data at a speed that the user will find acceptable.

The Yoni-1 catalog database system is an example of an existing online catalog search system containing a considerable body of parametric data for a large number of high frequency electronic components. Users are able to access the catalog through standard web browser software and search for specific components with input variables including frequency range and other electrical performance characteristics, as well as package type. The search output lists the components in the catalog that match the user's search request.

While this type of system offers considerable benefit over simple tabular or graphed listings of devices and their relevant parameters, the search process frequently involves numerous iterations of guessing and refining entered data to gain a match with the component parametric data stored in the database. Further, the selection of high-frequency electronic components requires accurate information about the exact performance of the components under specific conditions of signal input and circuit application.

In another prior art example of a parametric database, a manufacturer of coil springs has an online catalog that allows users to enter a variety of mechanical and dimensional parameters for a desired spring, and the database search output provides a listing of which springs in the catalog will match the specified parameters. This search system has a disadvantage of treating all of the numerous displayed parameters as being of equal relevance, and listing a default choice of "All" for each one. This approach frequently leads to hundreds of springs being shown as search results, or in some cases no springs at all as search results if data for a null combination of parameters is input. In either case it is then up to the user to guess at what has gone wrong and attempt to enter better data for the search parameters, a process that results in the component search requiring numerous iterations.

U.S. Pat. No. 6,334,115 entitled COMPONENT ELECTRONIC CATALOG teaches an electronic component database system intended to aid in selecting and identifying components in a context of circuit design for improved placement during pc board assembly, wherein the stored data includes text-based information about the components, images of the components, mechanical package details and other data relevant to the preparation of automated or semi-automated picking and placing of components. This system is optimized for improving the assembly of components onto pc boards, but has no parameter-based search capabilities for the selection of components for basic circuit design.

U.S. Pat. No. 6,484,169 entitled SELECTION AND ORDERING OF LAMP COMPONENTS teaches an online catalog search system that has a prioritization scheme for a number of component attributes, wherein the user enters a numerical ranking for the importance of each attribute in the context of their specific application. Additionally, if no exact match is achieved with the entered parametric data, data ranges and prioritized attributes, the system informs the user of the no match condition and presents the option of viewing the components in the database that are judged to be closest to the user's criteria. This may lead the user astray, especially if there have already been several frustrating search iterations. There is also no provision for prioritizing the parametric data or data range entries.

SUMMARY

A more capable electronic component database search system comprises a database configured for organized storage and retrieval of physical data and parametric data for a plurality of electronic components, operating with a search engine defining the priority of the data input, this data being a combination of required data input and optional data input. Physical data includes packaging types, pinouts and dimensions as well as circuit board mounting criteria. Parametric data includes electronic characteristics such as performance data at a variety of voltage and frequency operating ranges. A query entry module connected to the search engine accepts input data from a user in the form of parameter values and parameter value ranges for a plurality of both physical and performance parameters, differing for each type of electronic component. Once a query is entered and a search performed, an output module provides either output of search data or output of a null search condition. If a null search condition results, a priority entry module prompts a user-directed choice of a highest priority search parameter and secondary priority search parameter for another iteration of the database search.

The data within a more capable electronic component database search system further comprises actual measured parametric data as opposed to data derived from component performance simulations. Interpolated parametric data added to the actual measured parametric data is used in some circumstances to increase the resolution of the data in the database.

OBJECTS AND FEATURES OF THE INVENTION

It is an object of the present invention to provide an electronic component database search tool that enables the user to perform a search within a given product category by entering values for their choice of specific parameters.

It is a another object of the present invention to operate with a database populated with a large volume of actual measured data, as opposed to data generated by simulation algorithms.

It is yet another object of the present invention to attempt to match performance limits or a performance window to a user's request.

It is still another object of the present invention to perform user-requested database searches rapidly, typically in a fraction of a second.

It is a further object of the present invention to provide the user with the option of obtaining tabular or graphed performance data for the range of parameters input during the component search.

It is a feature of the present invention that for each component type, at least one search parameter is identified as a required parameter, and at least one search parameter is identified as an optional parameter.

It is another feature of the present invention that unsuccessful searches may be re-run with prioritization of one or more search parameters.

BRIEF DESCRIPTION OF THE DRAWINGS

The present version of the invention will be more fully understood with reference to the following Detailed Description in conjunction with the drawings of which.

DESCRIPTION OF THE PREFERRED EMBODIMENT AND BEST MODE

The invention described herein is a database search system optimized for the matching of electronic components to a user's requirements. The web-based realization of the system is called Yoni2 as a successor to the Yoni-1 catalog database search system.

Figure 1:
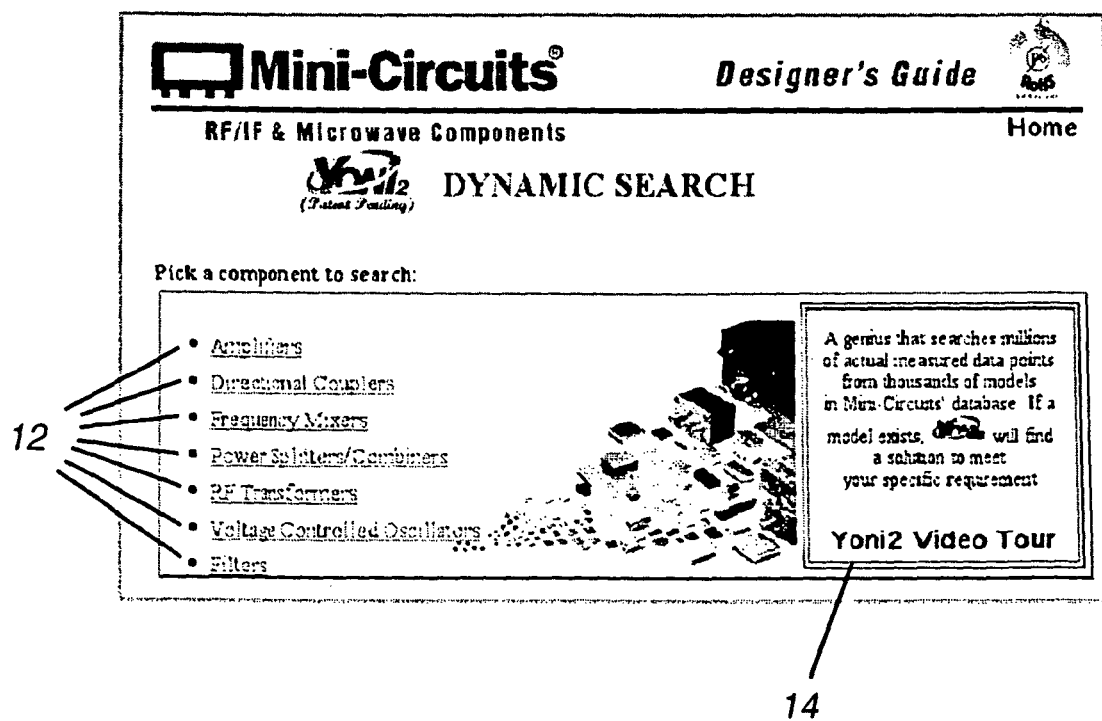
FIG. 1 is a representation of the entry screen of the Yoni2search tool.

The system is designed to be used over a computer network such as the world wide web, where the database, the search engine, the search entry module, the output module, the priority entry module and other software directly associated with the system is stored and maintained on one or more servers, and the users access the system from remote locations via standard browser software. FIG. 1 shows an image of the Yoni2 entry screen 10 displayed to a user. In the current version of the system, there are component type selection buttons 12 for Amplifiers, Directional Couplers, Frequency Mixers, Power Splitters/Combiners, RF Transformers, Voltage Controlled Oscillators and Filters. There is also a button to access a video tour 14 of the search system.

Figure 2:
FIG. 2 is a representation of a frequency mixer search request screen.

Once a component type selection button 12 is clicked, the system displays a search request screen 20 as shown in FIG. 2. The handling of input data and the communication of data to the search engine is controlled by the system's search query entry module. Each Search Request screen is different, customized for the particular component. In this example the component type 22 selected is Frequency Mixers. The search request screen 20 for Frequency Mixers has the physical parameter input Packaging Style 24, and parametric inputs for RF/LO Frequency 26, LO Power Level 28, Max. Conversion Loss 30, Min. LO-RF Isolation 32, MM. LO-IF Isolation 34, LO Frequency 36, Min. IP3 38, Max. RF port Voltage Standing Wave Ratio (VSWR) 40, Max. LO port VSWR 42, RF/LO Frequency 44, Max. IF port VSWR 46 and IF Frequency 48. The parameters Packaging Style 24, RF/LO Frequency 26 and Max. Conversion Loss 30 are required and on an actual screen are displayed as highlighted; other parameters are optional and are not highlighted on an actual screen. Components such as Max. Conversion Loss 30 require parameter values to be entered, and components such as RF/LO Frequency 26 require parameter value ranges to be entered.

Figure 3:
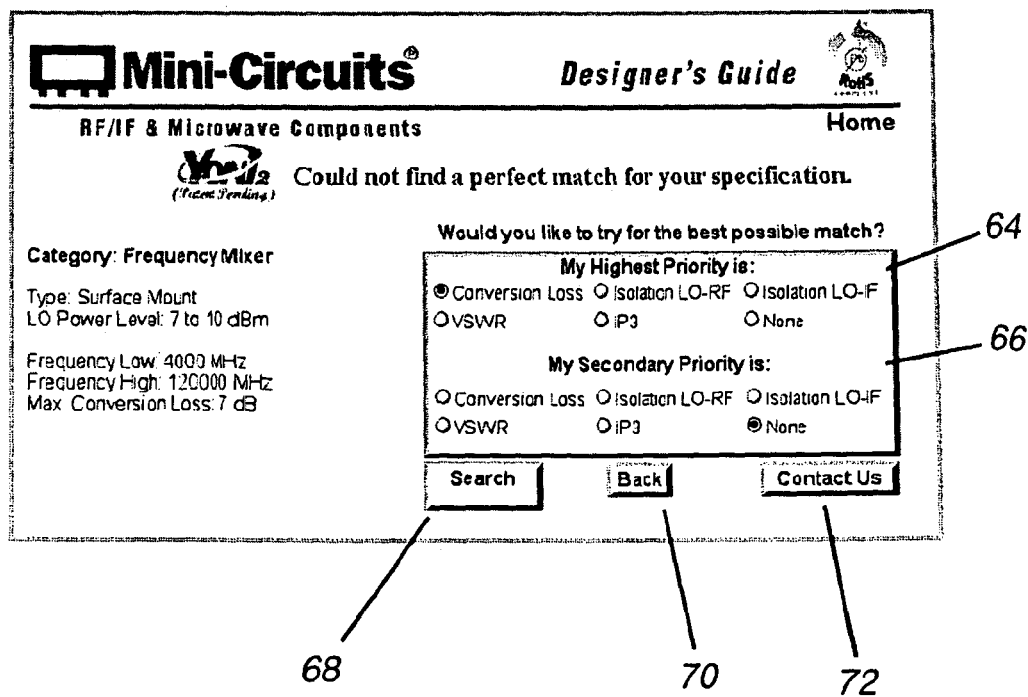
FIG. 3 is a representation of a prompt screen for highest and secondary search priorities.

Once the component parameter data is entered, either the Clear button 52 is clicked to clear the data and start over, or the Search button 50 is clicked and the system's search engine uses the entered parametric data and physical data to search the database for appropriate matches. If at least one perfect match for a set of component data to the specified parameters is not found, thus resulting in the search returning a null search condition, the priority entry module will prompt the user to assist in improving the match by providing a user-directed priority among a number of displayed parameters. FIG. 3 shows a Match Improvement screen 60 listing the component parameters already selected 62 and requesting as relative weights of importance for multiple input data a Highest Priority search parameter 64 and a Secondary Priority search parameter 66 to be chosen, with default Highest Priority and Secondary Priority search parameters selected to start. In this example, the search shown is for a broadband microwave frequency mixer for applications covering 4 to 12 GHz, and having no worse than a 10 dB conversion loss and being able to operate with a LO drive level of +7 dBm. The priority search parameters are Conversion Loss, LO-RF Isolation, LO-IF Isolation, IP3, VSWR, or None. Conversion Loss is the default choice for Highest Priority search parameter 64 and None is the default choice for Secondary Priority search parameter 66 for this improved query.

Once the priority search parameters are chosen, the Prioritized Search button 68 is clicked to begin the improved search. Alternately, the Back button 70 is clicked to return to the search request screen 20 of FIG. 2, or the Contact Us button 72 is clicked to enable the sending of email about the search results and the search system.

Figure 4:
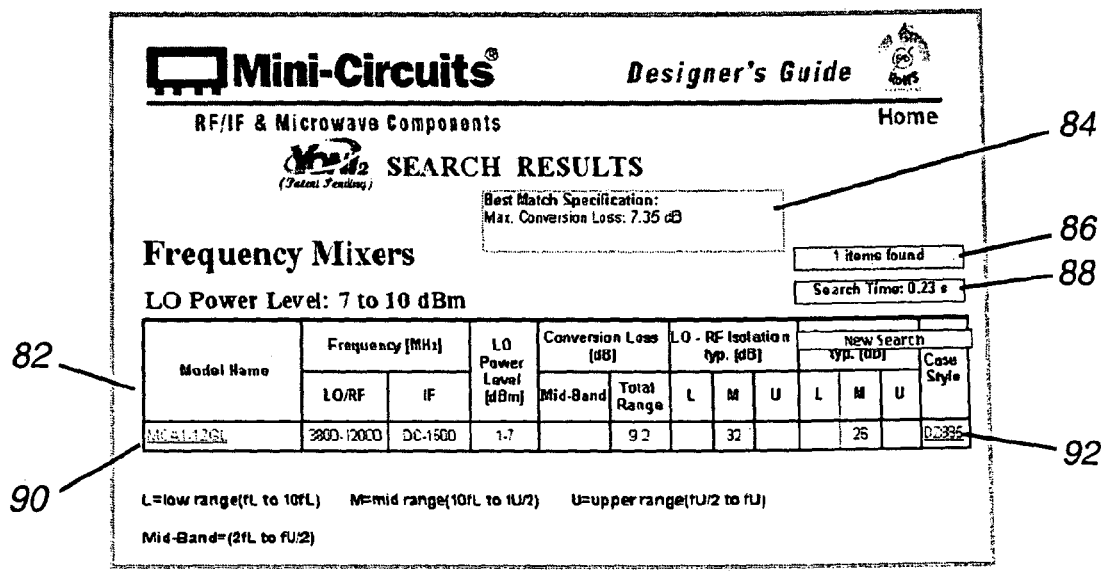
FIG. 4 is a representation of a screen showing search results for a frequency mixer.

Once the Prioritized Search button 68 is clicked, FIG. 4 shows a Search Results screen 80 displaying the search result 82, in this example a single result of a model MCA1-12 GL mixer with LO/RF range of 3.8 to 12.0 GHz and IF range of DC to 1.5 GHz. The Best Match Specification 84 resulting from the choice of priority search parameters is displayed. Additionally, the number of Items Found 86 and Search Time 88 showing the elapsed time for the query entry are displayed.

Figure 5:
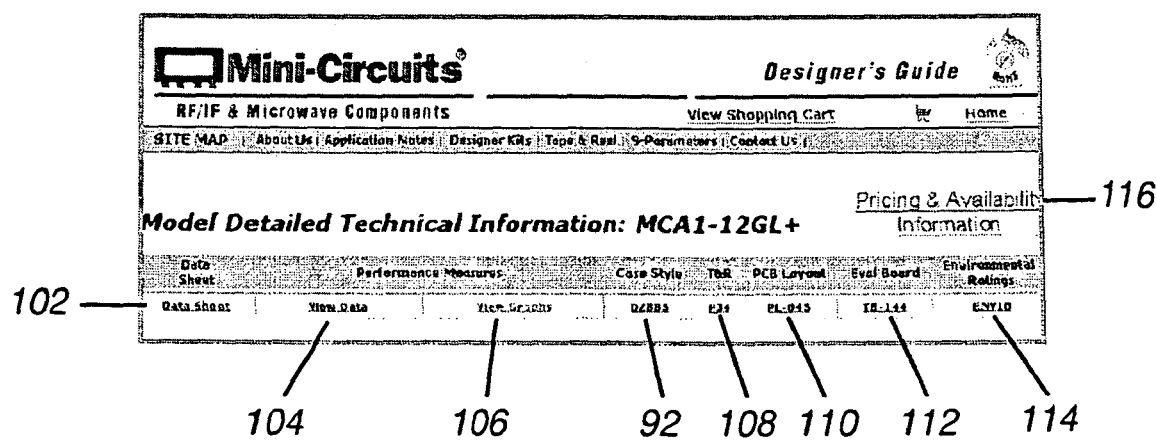
FIG. 5 is a representation of a screen showing links to more detailed information on a frequency mixer found in a search.

From the Search Results screen 80 of a mixer search, a user is able to gain further information by clicking on the Model Name 90 or the Case Style 92. The results of clicking on Model Name 90 is shown in FIG. 5, a Model Detailed Technical Information screen 100 that offers a Data Sheet button 102 as well as buttons for View Data 104, View Graphs 106, as well as stored component data including Case Style 92, Packaging Options 108 listing packaging types and dimensions, PCB Layout 110 including circuit board mounting data, information about an Evaluation Board 112 and Environmental Ratings 114. Additionally, there is a Pricing & Availability Information button 116.

Figure 6:
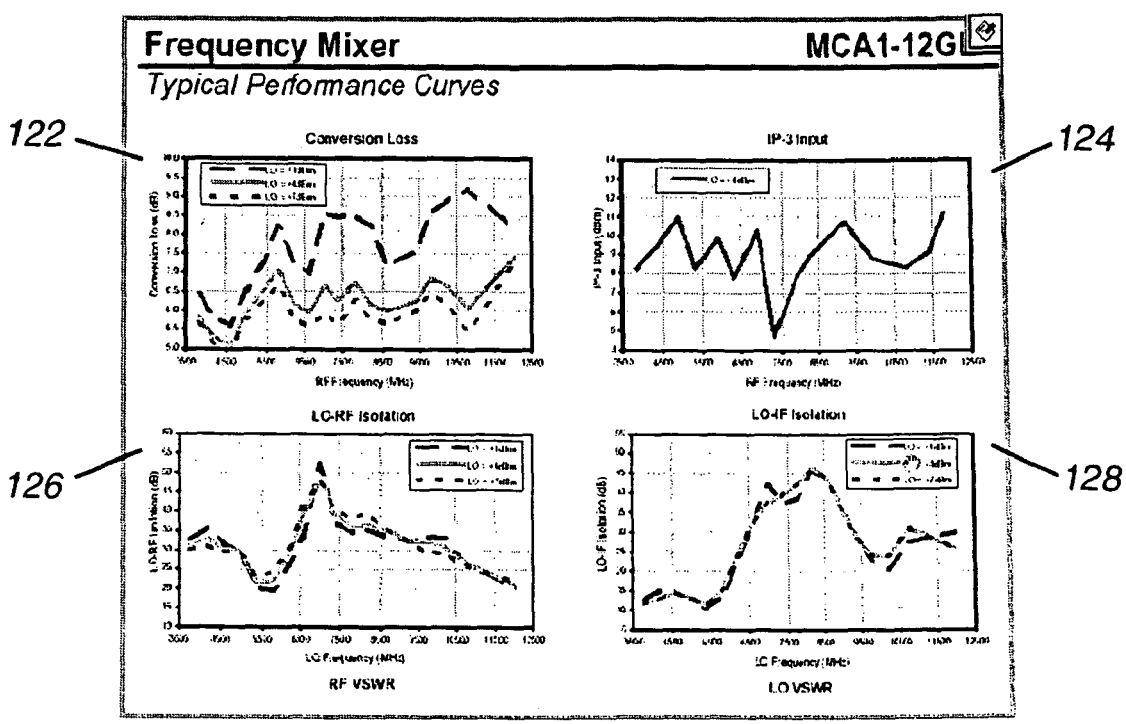
FIG. 6 is a representation of a screen showing detailed plots of performance calculated and displayed as a result of clicking on a "View Graphs" button.

Clicking on the View Graphs button 106 brings up on-screen plots of Typical Performance Curves 120 as shown in FIG. 6 that include Conversion Loss 122, IP3 Input 124, LO-RF Isolation 126 and LO-IF Isolation 128, as well as displaying VSWR for the LO, RF, and IF ports. Clicking the View Data 104 or View Graphs 106 button invokes another function of the Output Module portion of the system, which in addition to controlling graphic output of search results, controls the calculation and display of tables and graphs of performance data in ranges matching that entered for the parameter data supplied by the user for the search. The user is able to print or save a component data sheet locally.

The search screen and the screens that follow are customized for each type of component. For example, when searching for a particular VCO, the search screen permits search parameters to be entered for oscillator frequency range, supply voltage, phase noise at four different offset frequencies (although ideally only one or two of these entries need be completed for a successful search), minimum/maximum output power, minimum/maximum tuning sensitivity, and even harmonic levels. When viewing search results, as with the mixer, a user is able to save or print a data sheet and quickly view performance data or plots that include tuning linearity, harmonics, output power versus tuning voltage, frequency pushing, and phase noise. Additionally, similar to the example of the mixer, information is provided about component packaging options, housing dimensions, circuit-board mounting, and an evaluation board.

In the case of an amplifier, search parameters include package style, frequency range, minimum gain and isolation, minimum output power, and maximum noise figure. For amplifiers, data is available for power gain, input and output return loss, isolation, and S-parameters. The S-parameter data are invaluable for modeling commercial components in commercially available circuit simulators. Having the actual measured S-parameter data (rather than general parameters) improves simulation accuracy and can reduce the time needed for achieving meaningful simulation results.

A further embodiment of the search system contains data and search capability for additional high frequency electronic components including coaxial adapters, analog and digital attenuators, DC blocks, RF switches, terminations, and test cables.

Yet another embodiment of the search system uses interpolation algorithms to further populate the parametric data portions of the database.

Still another embodiment of the search system uses interpolation algorithms to provide additional parametric data in response to the range of a user's search inquiry and thus increase the density of parametric data available for the search.

Having described herein illustrative embodiments and best mode of the present invention, persons of ordinary skill in the art will appreciate various other features and advantages of the invention apart from those specifically described above. It should therefore be understood that the foregoing is only illustrative of the principles of the invention, and that various modifications and additions can be made by those skilled in the art without departing from the spirit and scope of the invention. Accordingly, the appended claims shall not be limited by the particular features that have been shown and described, but shall be construed also to cover any obvious modifications and equivalents thereof.

What is claimed is:

1. An electronic component database search system comprising:

a database configured for organized storage and retrieval of physical data and parametric data for a plurality of electronic components;

a search engine defining the priority of required data input and optional data input in communication with said database;

a query entry module configured to accept data input from a user in the form of parameter values and parameter value ranges for a plurality of physical data and parametric data;

the plurality of physical data and parametric data differing for each of the plurality of electronic components;

the plurality of physical data and parametric data further being a combination of the required data input and the optional data input;

said search engine accepting a query from said search entry module and performing a search within said database;

an output module in communication with said search engine, said output module configured for providing either output of search data or output of a null search condition;

a priority entry module configured, upon occurrence of the null search condition to prompt a user-directed priority of the required data input and the optional data input to be selected;

the user-directed priority providing relative weights of importance to multiple data input during a search iteration, thus producing an improved query accepted by said search engine; and, said search engine thereby performing an improved search within said database.

2. An electronic component database search system as described in claim 1 wherein said electronic components operate at high frequencies of at least radio frequency.

3. An electronic component database search system as described in claim 1 wherein said electronic components are selected from the group consisting of amplifiers, directional couplers, frequency mixers, power splitters/combiners, RF transformers, voltage controlled oscillators, filters, coaxial adapters, analog and digital attenuators, DC blocks, RF switches, terminations, and test cables.

4. An electronic component database search system as described in claim 1 wherein said parametric data is actual measured parametric data.

5. An electronic component database search system as described in claim 4 wherein said parametric data is actual measured parametric data and interpolated parametric data.

6. An electronic component database search system as described in claim 4 wherein additional parametric data is interpolated in response to at least one of said parametric value ranges of a query entry.

7. An electronic component database search system as described in claim 5 wherein additional parametric data is interpolated in response to at least one of said parametric value ranges of a query entry.

8. An electronic component database search system as described in claim 1 wherein said output module further provides the elapsed time for a search.

9. An electronic component database search system as described in claim 1 wherein said output of search data includes at least one table of performance data for said parameter value ranges.

10. An electronic component database search system as described in claim 1 wherein said output of search data includes at least one graph of performance data for said parameter value ranges.

11. An electronic component database search system as described in claim 1 wherein said output module provides said user with a component data sheet enumerating said search data in a format selected from the group consisting of a data sheet suitable for local printing and a data sheet suitable for local saving.

12. An electronic component database search system as described in claim 1 wherein said output module provides access to stored component data selected from the group consisting of package types and dimensions, circuit board mounting and layout, environmental ratings, information about an evaluation board, component pricing and component availability.

13. An electronic component database search system as described in claim 1 wherein said user-directed priority of said required data input and said optional data input is a highest priority search parameter.

14. An electronic component database search system as described in claim 1 wherein said user-directed priority of said required data input and said optional data input is a highest priority search parameter and at least a secondary priority search parameter.

15. An electronic component database search system comprising:
  a database configured for organized storage and retrieval of physical data and parametric data for a plurality of electronic components;
    the parametric data being actual measured parametric data and interpolated parametric data;
    the electronic components being selected from the group consisting of amplifiers, directional couplers, frequency mixers, power splitters/combiners, RF transformers, voltage controlled oscillators and filters;
  a search engine defining the priority of required data input and optional data input in communication with said database;
  a query entry module configured to accept input data from a user in the form of parameter values and parameter value ranges for a plurality of physical data and parametric data;
    the plurality of physical data and parametric data differing for each of the plurality of electronic components;
    the plurality of physical data and parametric data further being a combination of the required data input and the optional data input;
  said search engine accepting a query from said search entry module and performing a search within said database;
  an output module in communication with said search engine, said output module configured for providing either output of search data or output of a null search condition;
  the search data including at least one table of performance data and at least one graph of performance data;
  a priority entry module configured, upon occurrence of the null search condition to prompt a user-directed priority of the required data input and the optional data input to be selected;
  the user-directed priority providing relative weights of importance to multiple data input during a search iteration, thus producing an improved query accepted by said search engine;
  said search engine thereby performing an improved search within said database;
  said output module providing the user with a component data sheet enumerating the search data in a format selected from the group consisting of a data sheet suitable for local printing and a data sheet suitable for local saving;
  said output module further providing the elapsed time for a search; and,
  said output module further providing access to stored component data selected from the group consisting of package types and dimensions, circuit board mounting and layout, environmental ratings, information about an evaluation board, component pricing and component availability.

16. An electronic component database search system as described in claim 15 wherein additional parametric data is interpolated in response to one of said parametric value ranges of a query entry.

17. An electronic component database search system as described in claim 15 wherein said electronic components are selected from the group consisting of amplifiers, directional couplers, frequency mixers, power splitters/combiners, RF transformers, voltage controlled oscillators, filters, coaxial adapters, analog and digital attenuators, DC blocks, RF switches, terminations, and test cables.

18. An electronic component database search system as described in claim 15 wherein said electronic components operate at high frequencies of at least radio frequency.

19. A method of searching a database for electronic components, comprising the steps of:
  (1) entering a component type into a component choice screen;

(2) viewing a component parameter screen provided in response to said component type entry wherein at least one parameter is required data and at least one parameter is optional data;
(3) entering parameter values and parameter value ranges for said parameters that are required data;
(4) optionally entering parameter values and parameter value ranges for said parameters that are optional data;
(5) selecting a parameter as a highest priority parameter;
(6) viewing the returned component search results;
(7) upon occurrence of a null search condition, responding to a prompt to select user-directed priorities for said parameters that are required data input and said parameters that are optional data input, thereby providing relative weight of importance to data input during a search iteration; and,
(8) viewing the improved returned component search results.

20. A method as described in claim 19 wherein step (5) further comprises the substep of:
   selecting a second parameter as a secondary priority parameter.

21. A method as described in claim 19, further comprising the step of:
   choosing further actions from the group consisting of changing at least one parameter value in order to alter the search results, saving a component data sheet, printing a component data sheet, viewing tabular component performance data, and viewing graphed component performance data.

22. A method as described in claim 19, further comprising the step of:
   accessing stored component data selected from the group consisting of package types and dimensions, circuit board mounting and layout, environmental ratings, information about an evaluation board, component pricing and component availability.

23. A method of searching a database for electronic components, comprising the steps of:
   (1) entering a component type into a component choice screen;
   (2) viewing a component parameter screen provided in response to said component type entry wherein at least one parameter is required data and at least one parameter is optional data;
   (3) entering parameter values and parameter value ranges for said parameters that are required data;
   (4) optionally entering parameter values and parameter value ranges for said parameters that are optional data;
   (5) viewing the returned component search results;
   (6) viewing a search improvement screen if said returned component search results are a null value;
   (7) selecting and entering in said search improvement screen in response to a prompt, a parameter as a user-directed highest priority parameter and optionally input a user-directed secondary priority parameter, thereby providing relative weight of importance to data input during a search iteration; and,
   (8) continuing the database search.

24. A method as described in claim 23 wherein step (7) further comprises the substep of:
   selecting a second parameter as a secondary priority parameter.

25. An electronic component database search system as described in claim 1 wherein said priority entry module has initial default priorities set for the required data input and the optional data input.

* * * * *